May 15, 1951           J. L. LAQUERRE           2,552,725
GAINER BELT TENSIONER
Filed May 16, 1947
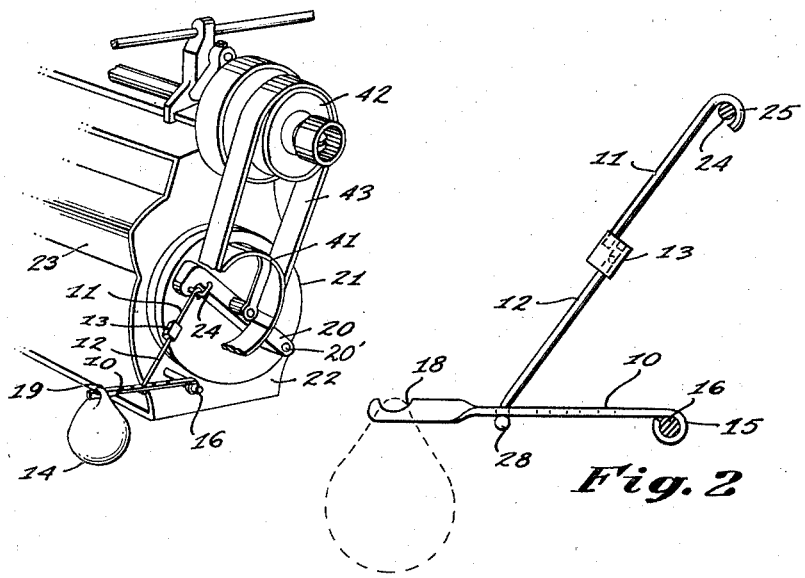
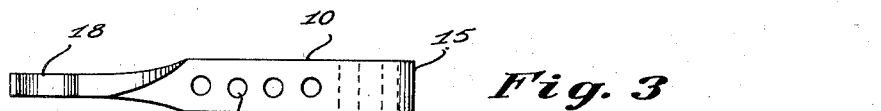
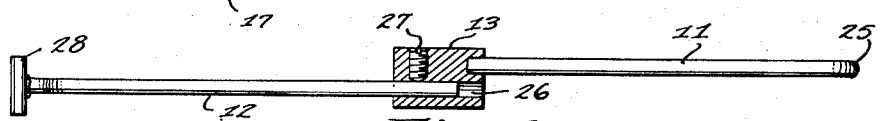
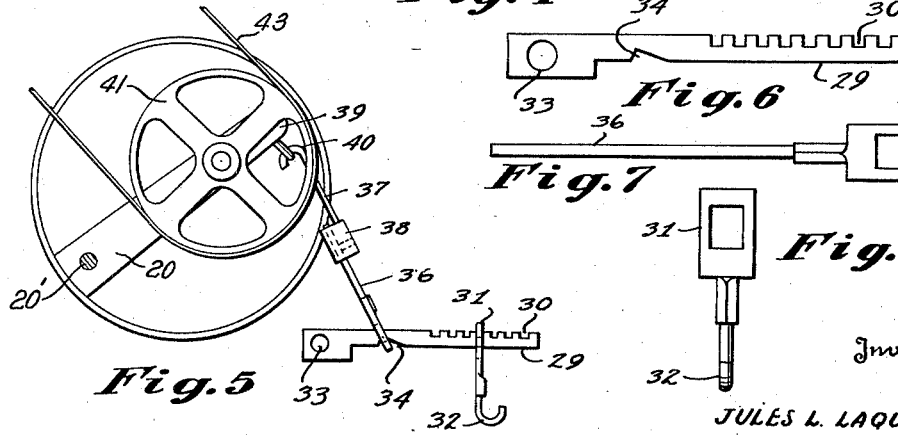
Inventor
JULES L. LAQUERRE
By McMorrow, Berman & Davidson
Attorneys Patented May 15, 1951

2,552,725

UNITED STATES PATENT OFFICE 2,552,725

GAINER BELT TENSIONER

Jules L. Laquerre, Woonsocket, R. I.

Application May 16, 1947, Serial No. 748,587

3 Claims. (Cl. 74—242.12)

This invention relates to belt-tensioning and take-up devices, wherein increased tension is automatically and continuously applied to endless belts traveling over pulleys, particularly as used on yarn-winding machines, such as gainers, and in particular, the invention includes an outwardly extending arm pivotally mounted on an end of the machine adjacent the pulley on the gainer case, a bar connecting the arm to the gainer case, and a weight depending from the outer end of the arm.

The purpose of this invention is to provide improved tensioning means for gainers, wherein a more uniform lay of yarn on the wound package is obtained.

Various devices have been provided for increasing or adjusting the tension of gainer belts to obtain a more uniform layer of yarn and to accomplish this end weights of various descriptions have been applied to the gainer pulley; and whereas this has resulted in some improvement, there is danger that the increased strain on the belt will result in shorter belt life and in excessive wear on the spindle and cam shaft bearings. This is due primarily to the fact that the strain is applied to the belt by the force of gravity, and this is in a vertical plane, whereas a plane through the centers of the pulleys extends at an acute angle to the vertical plane.

With this thought in mind, this invention contemplates a tensioning device having a weight arm and a connecting brace wherein the force of gravity may be applied directly in a plane through the centers of the pulleys of the gainer belt.

The object of the invention is to provide a combination of mechanical instrumentalities wherein the line of force of a weight attached to the gainer pulley is changed from a vertical direction to an angular direction corresponding with a plane extending through the centers of the gainer belt pulleys.

Another object of the invention is to provide a tensioning attachment for gainer belts which provides a direct pull on the belt that may be applied to machines now in use.

A further object of the invention is to provide a device for applying tension to a gainer belt through a line of force extending through the centers of the pulleys of the belt, which is of a simple and economical construction.

With these and other objects in view, the invention embodies a tensioning device for gainer belts, wherein an endless gainer belt drives a gainer pulley from a driving pulley, with the pulleys and belt positioned on one end of a gainer and with the gainer pulley rotatably mounted on a gainer case, wherein a substantially horizontally positioned arm extends laterally outward from the end of the machine with the inner end thereof pivotally mounted on the machine and the outer end provided with a weight, and the arm is attached to the gainer case by a diagonally disposed bracket having means therein for adjusting the length thereof.

Other features and advantages of the invention will appear from the following description taken in connection with the drawings, wherein:

Figure 1 is a view showing a partial elevation of an end of a gainer with part of the gainer pulley broken away, illustrating the device as it would appear in use.

Figure 2 is a view showing the arm and brace of the attachment with a weight indicated on the end of the arm in dotted lines.

Figure 3 is a plan view of the arm with the other parts omitted.

Figure 4 is a view illustrating the brace connecting the arm to the gainer case with the socket providing adjustment in the length of the brace shown in section.

Figure 5 is a view illustrating a modification wherein the arm is provided with a plurality of weight-supporting notches, and the device is illustrated on a machine with the gainer pulley on the side of the machine opposite to that of the machine shown in Figure 1.

Figure 6 is a detail showing the weight-holding arm of the attachment illustrated in Figure 5.

Figure 7 is a detail, showing the lower element of the supporting brace of the device illustrated in Figure 5.

Figure 8 is a detail showing the weight-supporting hook of the device illustrated in Figure 5.

Referring now to the drawings, wherein like reference characters indicate corresponding parts, the gainer belt-tensioning device of this invention includes an arm 10, a brace formed of elements 11, 12, and 13, and a weight 14.

In the arrangement shown in Figures 1, 2, 3, and 4, the arm 10 is provided with an eye 15 at its inner end by which it is pivotally supported on a bolt 16 projecting from a support on the gainer. The intermediate portion of the arm 10 is provided with openings 17 through which the lower end of the lower element 12 of the brace extends, as shown in Figure 2. The arm 10 is given a generally horizontal position and its outer end is provided with a hook 18 over which the eye 19 of a weight 14 is placed, as shown.

The upper end of the upper brace element 11 has a hook 25 engaged in an eye 24 on the upper end of an inclined pulley supporting arm 20 whose lower end is eccentrically pivoted on a portion 21 on the end 22 of a gainer 23, the pivot for the arm 20 being designated by the reference numeral 20'. The lower end of the upper element 11 is fixedly mounted in the connector 13, as shown in Figure 4, and the upper end of the lower element 12 is slidably inserted in a socket 26 in the connector and held in adjusted position by a set screw 27. The lower end of the lower element 12 is provided with a cross head 28 to engage the under side of the arm 10, with the element 12 passing through a select one of the holes 17, as clearly shown in Figure 2.

In the arrangement shown in Figures 5, 6, 7, and 8, the attachment is provided with a horizontal arm 29 similar to the arm 10, but provided on its upper edge with notches 30 to receive a yoke 31 of a weight-supporting hook 32, and the inner end thereof is provided with an opening 33 through which a pin or bolt similar to the bolt 16 is passed. The lower edge of the arm 29 is provided with a notch 34 to receive a yoke 35 on the lower end of the lower element 36 of the brace and an upper element 37 thereof which is held in the intermediate connector 38 is attached to the upper end of a pulley carrying arm 39 through a hook 40.

With the parts arranged as described and, as illustrated in Figure 1, the vertical force exerted on the weight 14 by gravity is changed to an angularly disposed force pulling directly in a plane extending through the center of the driving pulley 41 mounted on the arm 20 and also through the center of the drive pulley 42. The gainer belt 43 trained over the pulleys is, therefore, continuously held in tension by a direct force in a plane extending through the centers of the drive pulley 42 and the driving pulley 41 on which the belt is mounted. To insure absolute alignment of the parts, the supporting brace formed of the elements 11, 12, and 13 is adjustable so that the line of force may be held exactly in line at all times. It will also be understood that the force may be varied by using weights of different sizes, or the position of the weights on the arm may readily be adjusted.

It will be understood that other modifications may be made in the design and arrangement of the parts without departing from the spirit of the invention.

What is claimed is:

1. The combination with a support having a horizontal axis drive pulley, an inclined arm pivoted at the lower end of said support below said drive pulley on an axis parallel to the axis of said drive pulley, a driving pulley mounted on said arm on an axis parallel to the axis of said drive pulley, a belt trained on said drive and driving pulleys, a horizontal tensioning arm pivoted on said support below said driving pulley on an axis, parallel to the axis of said driving pulley, a weight on the outer end of said tensioning arm, and a diagonal brace extending between said horizontal tensioning arm and the upper end of said inclined pulley arm, whereby said driving pulley is tensioned downwardly to tighten said belt, said brace comprising upper and lower elements, a connector secured to the lower end of said upper element, and means connecting the upper end of said lower element to said connector enabling longitudinally adjusting said lower element relative to said connector to vary the length of said brace.

2. The combination with a support having a horizontal axis drive pulley, an inclined arm pivoted at the lower end on said support below said drive pulley on an axis parallel to the axis of said drive pulley, a driving pulley mounted on said arm on an axis parallel to the axis of said drive pulley, a belt trained on said drive and driving pulleys, a horizontal tensioning arm pivoted on said support below said driving pulley on an axis, parallel to the axis of said driving pulley, a weight on the outer end of said tensioning arm, and a diagonal brace extending between said horizontal tensioning arm and the upper end of said inclined pulley arm, whereby said driving pulley is tensioned downwardly to tighten said belt, said brace comprising upper and lower elements, a connector secured to the lower end of said upper element, and means connecting the upper end of said lower element to said connector enabling longitudinally adjusting said lower element relative to said connector to vary the length of said brace, and means acting between the lower end of said lower element and said horizontal tensioning arm whereby the lower end of said lower element can be engaged with said tensioning arm at different longitudinally spaced points therealong to vary the tightening of said belt.

3. The combination with a support having a horizontal axis drive pulley, an inclined arm positioned below said drive pulley and having one end pivoted on said support, a driving pulley disposed in coplanar relation with respect to said drive pulley and mounted on said arm for rotation about an axis parallel to the axis of said drive pulley, and a belt trained on said drive and driving pulleys, of a horizontally disposed tensioning arm positioned below said inclined arm and having one end mounted on said support for rocking movement about a horizontal axis, a weight positioned adjacent the other end of said tensioning arm and supported on the latter, brace means extending between said horizontal tensioning arm and the adjacent end of said inclined pulley arm and secured therebetween whereby said driving pulley is tensioned downwardly to tighten said belt, and means carried by said brace means for varying the length of the latter.

JULES L. LAQUERRE.

REFERENCES CITED

The following references are of record in the file of this patent:

UNITED STATES PATENTS

| Number | Name | Date |
|---|---|---|
| 880,816 | Null | Mar. 3, 1908 |
| 1,089,381 | Rhoades | Mar. 3, 1914 |
| 1,790,736 | Bailey | Feb. 3, 1931 |
| 2,292,580 | Moyer et al. | Aug. 11, 1942 |